United States Patent [19]

Meredith et al.

[11] 4,130,241
[45] Dec. 19, 1978

[54] CONTROL SYSTEMS

[75] Inventors: James F. Meredith, Cheltenham; Brian Williams, Bishops Cleeve, both of England

[73] Assignee: Smiths Industries Limited, Cricklewood, England

[21] Appl. No.: 776,448

[22] Filed: Mar. 10, 1977

[30] Foreign Application Priority Data

Mar. 10, 1976 [GB] United Kingdom ............... 9643/76

[51] Int. Cl.² .............................................. G06F 11/08
[52] U.S. Cl. ..................................... 235/307; 318/564
[58] Field of Search ................ 235/153 AE, 153 BN, 235/150.2, 307; 340/146.1 BE; 318/563, 564; 244/194, 195; 364/741, 200, 900, 101, 119

[56] References Cited

U.S. PATENT DOCUMENTS

| | | | |
|---|---|---|---|
| 2,861,744 | 11/1958 | Schmitt et al. | 235/153 AH |
| 3,351,315 | 11/1967 | Carson et al. | 340/146.1 BE |
| 3,593,307 | 7/1971 | Gouge, Jr. | 235/153 AE |
| 3,688,099 | 8/1972 | Buscher | 235/153 AE |
| 3,805,235 | 4/1974 | Foster et al. | 235/153 AE |
| 3,882,406 | 5/1975 | Graves et al. | 235/153 AE |
| 3,931,505 | 1/1976 | Sevcik | 235/153 AE |
| 4,032,757 | 6/1977 | Eccles | 235/150.2 |

Primary Examiner—Charles E. Atkinson

Attorney, Agent, or Firm—Pollock, Vande Sande & Priddy

[57] ABSTRACT

A quadruplex, double-failure survival, fly-by-wire aircraft control system includes two monitor lanes whose outputs are consolidated with those of the four main control lanes to drive the aircraft control-surfaces by hydraulic rams via individual spool-valve actuators. Nominally-identical sets of pilot's-demand, instrument, and position-feedback signals are derived independently for the four lanes respectively, and digital representations of all these are exchanged between the control lanes for the selection of their mean or median values by digital processors that also serve to compute the control outputs of the lanes from the selected values. The sets of signals supplied to one pair of the four lanes are reversed in sense compared with the sets supplied to the other pair so as to ensure that the same digitally-encoded data is represented differently in the different pairs and the possibility of a context-dependent failure occurring simultaneously in both pairs is thereby avoided. The outputs of the control lanes are amalgamated to provide intermediate-value inputs to the monitor lanes. An alternative monitored-duplex single-failure survival fly-by-wire system has two control lanes with reversal of sense of input and feedback signals as between one lane and the other. Difference of digital representation in a third, monitor lane is provided by halving the amplitude of the input and feedback signals supplied to this lane.

9 Claims, 3 Drawing Figures

CONTROL SYSTEMS

BACKGROUND OF THE INVENTION

This invention relates to control system, and in particular to control systems utilizing digital processing techniques.

The invention is especially concerned with failure-survival control systems of the kind in which two or more control lanes, each capable of providing the control output required of the system, are operated together so as to provide a degree of redundancy that is utilized to ensure continued correct control in spite of the occurrence of a fault or failure in the system. Systems of this kind have been used for controlling flight of aircraft, and in this context have more usually involved the processing of data in analogue form in each of three or more lanes, and comparison between the output signals of the lanes for determining the existence of a fault or failure in any of them. Such a system possesses a high degree of integrity against malfunction arising from component failure, because the probability of a majority of the lanes suffering failures at exactly the same time (and thus generating consistent, incorrect output signals) is of an extremely low order of magnitude.

Correct operation of each lane, however, depends not only on the functioning of the equipment in the lane, but also on the supply of valid data to it. For this reason a set of sensors, usually equal in number to the number of control lanes, is provided for each item of input data. The sensors of each set supply nominally-identical signals representative of the value of the relevant item of data to the respective control lanes, but there are inevitable slight differences between these signals arising from the manufacturing and operating tolerances that will exist between the different sensors of the set. Thus if no remedial action were taken in the system to equalize the data signals used in the different control lanes, the output control signals of these lanes would in general always be different from one another. Although these differences between the output signals of the control lanes might not be large enough to exceed the threshold for detection of a fault or failure, existence of them could very easily prejudice appropriate detection of a real fault or failure within a lane, or make the detection process too sensitive to minor, unimportant differences between the lanes.

In order to achieve equalization and avoid the undesirable consequences of slight differences between the nominally-identical sensor-signals, use may be made of amalgamation techniques. In these an amalgamate signal is derived in each lane in respect of each set of sensors, the amalgamate having a value (for example, the mean or a median value) intermediate the sensor-signal values. Any sensor signal differing by more than some prescribed amount and outside the acceptable tolerance range, is automatically excluded from the amalgamation process, and thereby cannot affect lane operation.

Amalgamation of the various sets of input-data signals, and the computation from the resultant intermediate-valued amalgamate signals of the appropriate control demand in each lane, can be readily carried out using digital processing. However, the application of digital processing techniques to plural-lane control systems introduces a new problem in the detection of malfunction. Digital computing or other processing techniques involve the use of complex arrangements of logic circuits (such as NAND-gates, NOR-gates and shift registers), and there is a risk that in implementing the required design of a digital system in terms of these logic circuits and their interconnections, additional unintended logical functions may be created. Since these spurious functions do not arise as an intentional part of the design, there is no provision in the design for system operation involving them. More particularly, there is the possibility that some particular digital data-representations will interact with certain instructions in the program that controls operation of the process, in an unexpected and unpredictable manner. Consequently there is the risk of a malfunction arising, not as a result of any fault or component failure, but rather as a result of a latent design defect either alone or in combination with the effect of component tolerances. All control lanes having the same design and operational program would in general be subject to the same malfunction, and so comparison between them would not be capable of revealing the existence of the malfunction; such malfunction, affecting all the lanes in the same way, is termed a common-mode failure.

An analogue system can be tested to eliminate unexpected results by checking its operation for various values of each input signal from one extreme to the other, and then relying on the linearity of the system to infer the results in respect of intermediate values. In contrast, with a digital processing system the discontinuous nature of the digital signals involved limits the inference that can be drawn about its behaviour in respect of any one combination of digital data and program, from its behaviour in respect of any other combination. Thus, normally, the only sure way of providing a digital system with an acceptable level of confidence in its operation would be to check every possible combination of digital data and program instruction. However, these combinations can number many millions, and such testing would therefore in general occupy a prohibitive length of time.

BRIEF SUMMARY OF THE INVENTION

It is one object of the present invention to provide an improved form of control system utilizing digital processing techniques.

It is another object of this invention to provide a plural-lane control system utilizing digital processing techniques, that embodies safeguards against common-mode failure without the need for prohibitively-lengthy testing of the system.

It is an additional object of the invention to provide a plural-lane, failure-survival control system utilizing digital processing in which amalgamation of signals is carried out digitally.

According to one aspect of the invention there is provided a plural-lane control system in which different digital representations are used in the processing of the same data in different ones of the lanes.

With a plural-lane control system utilizing different digital-data representations as between two lanes, there is the advantage that even if a digital data-representation in one of the lanes causes an adverse interaction in that lane, the other lane will not be subject to the same malfunction. This is because the other control lane will not contain the same representation of that data value, so one of the causes of the interaction will be absent from this other control lane. Consequently, both lanes will not be subject to the same malfunction simultaneously.

The same values of data may be represented in the different lanes by digital representations that differ from one another in sense. The difference in sense, which may be the only difference, or only one of a plurality of such differences utilized, may be readily achieved simply by reversing in respect of one, or some only, of the lanes, the lead connections or polarity with which signals from transducers and other sources are supplied to the lanes. The representational-differences between the lanes may instead, or in addition, be based on the existence of a proportional relationship. More specifically, a constant ratio, for example 1:2, may exist between the representation of each item of data in one lane and the representation of the same item in the other lane.

Each lane may include a digital processor that derives the intermediate values or amalgamates appropriate to the different items of input data, and computes from them the appropriate, digital demand-signal. This signal may be converted into analogue form and used in combination with feedback signals to derive, in the normal way, the required output-command control. However the feedback data may also be processed digitally.

In the more general context and according to another aspect of the present invention there is provided a plural-lane control system in which each lane includes a digital processor that processes feedback as well as input-data of the lane.

The digital processing of the feedback data in accordance with the latter invention-aspect readily enables amalgamation of feedback signals to be effected in the digital processors, in a most economical and advantageous way, and in the same manner as that used for the input signals. Furthermore, it readily enables the feedback data to be exchanged between the lanes for amalgamation purposes in the same form, and over the same paths, as the input data. The security and other advantages of digital-transmission techniques can accordingly be readily realised for the feedback data, as well as for the input data.

In prior-art systems feedback data is handled and processed in analogue form, and this applies also to proposals where digital processing of the input data is involved. In one such proposal, for example, involving four control computers that control six actuators, a digital-demand signal is derived in each computer by digital processing of the input data, and is then converted into analogue form for comparison with an analogue displacement-feedback signal derived from the actuators. The comparison is carried out in an individual differential amplifier, and the analogue command-signal outputs of all four amplifiers are then submitted to a process of amalgamation. More particularly, the four command signals are all applied to six voter-monitor circuits which serve to provide respective output signals that are equalized to a substantial extent as regards any differences between the analogue feedback signals supplied to the differential amplifiers. These output signals are used to control the individual actuators of the system.

With the control system of the present invention the feedback data, rather than being dealt with in analogue form as in the prior proposal, may be processed in digital form together with the input data. The existing digital processors used to process the input data may be used for all processing of the feedback data, so that the additional analogue voter-monitor circuits used in the proposed system for equalization in respect of the feedback signals, are no longer necessary. Such equalization can be carried out directly on the digital representations of the feedback data in exactly the same way as for the input data. A substantial reduction in the complexity and weight of equipment in the system is therefore readily obtainable.

Two control systems in accordance with this invention for fly-by-wire flight-control of an aircraft will now be described, by way of example, with reference to the accompanying drawings.

DETAILED DESCRIPTION

The first system to be described is part of a quadruplex flight-control installation replacing the conventional mechanical linkages between the pilot's controls and the moveable aerodynamic-control surfaces (namely, elevators, ailerons and rudder) of the aircraft. Movements of the pilot's controls are sensed by electrical transducers that generate electrical signals representative of these movements, and the positions of the control surfaces and the motions of the aircraft are similarly sensed to produce two more groups of signals. The three groups of signals are supplied to servo-computers which derive from them the electrical command signals appropriate for actuation of the aircraft control-surfaces in accordance with the pilot's demands in pitch, bank and yaw. The pilot's controls and the control surfaces are thus linked solely by electrical circuits, and the control and safety of the aircraft is very dependent on the integrity of these circuits.

Figure 1:
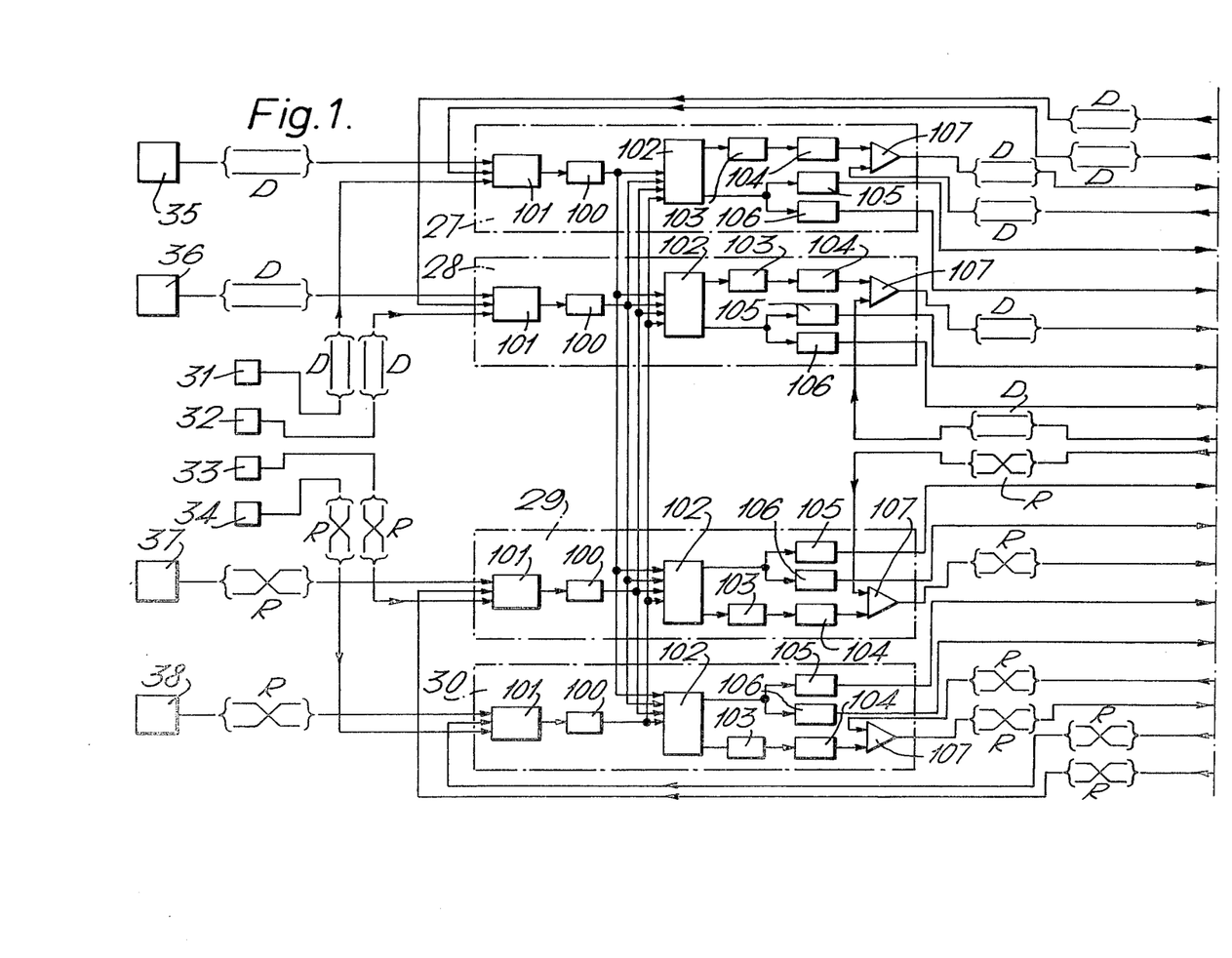
FIGS. 1 and 2 when placed side by side together provide a block schematic diagram of a first of the two flight-control systems.
Figure 2:
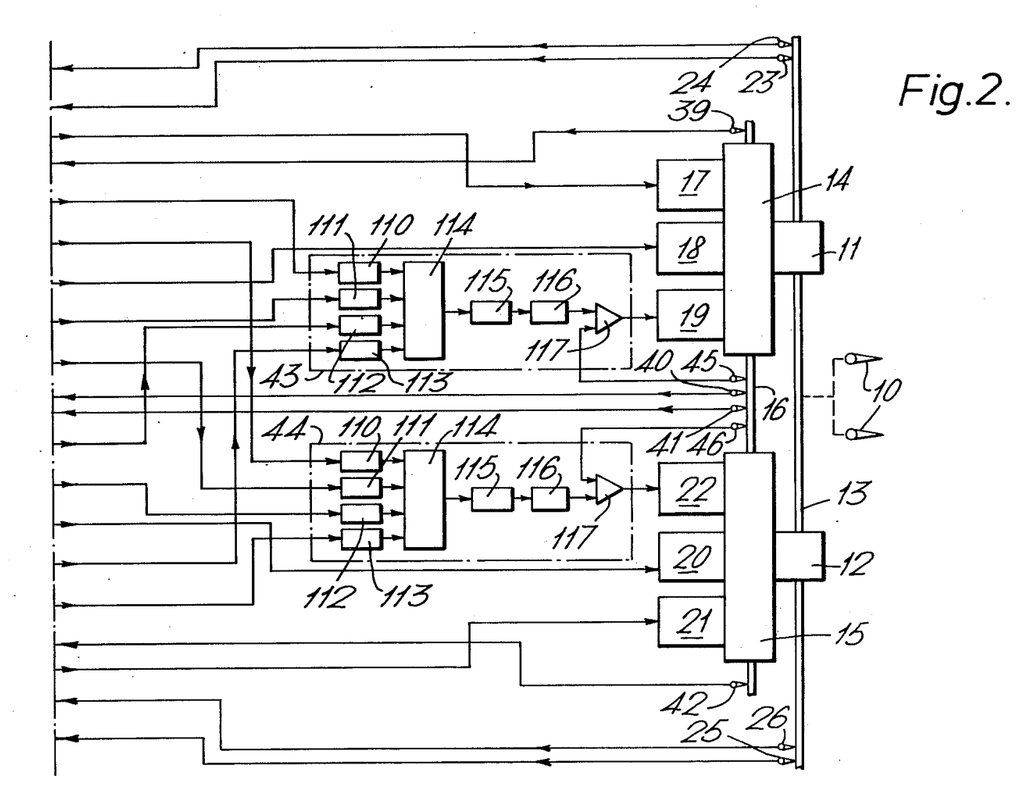

Referring to FIGS. 1 and 2, the elevator surfaces 10 of the aircraft are driven by two hydraulic rams 11 and 12 that are coupled together and to the elevator surfaces 10 by a common link 13. Hydraulic fluid is supplied to the rams 11 and 12 via respective spool-valves 14 and 15 which are intercoupled mechanically via a link 16, and which are positioned by two sets of three servo-valve actuators 17 to 19, and 20 to 22, respectively. A set of three actuators is provided to drive each valve 14 and 15 so that if one of the three (or its control circuitry) fails, disconnection of that actuator is unnecessary, since the remaining two actuators of the set, together with the three actuators of the other set, have sufficient power or authority between them to resist and overcome conflict from the 'failed' actuator.

The position of the linkage 13 is sensed by four transducers 23 to 26, each of which supplies an analogue signal in accordance with this position to a respective one of four flight-control computers 27 to 30. The control computers 27 to 30 also receive nominally-identical analogue signals in accordance with pitch-demands signalled from four transducers 31 to 34 respectively, that are coupled to the pilot's controls (not shown). Other nominally-identical analogue signals, in this case in accordance with motion of the aircraft, in particular the rate of change of attitude, are supplied to the computers 27 to 30 from four sources 35 to 38 in the appropriate instrumentation of the aircraft. Each of the control computers 27 to 30, indicated by a broken line, comprises the individual modules indicated by the solid-lined blocks within the broken line, which, with their mode of operation, are hereinafter described.

The four control computers 27 to 30 derive from the input and feedback data conveyed by the analogue signals, command signals appropriate for application to the actuators 17, 18, 21 and 22 to control the elevator-surfaces 10 in accordance with the pilot's pitch-demand. To this end each computer 27 to 30 includes an analogue-to-digital converter 100 which receives the input signals supplied to that computer, in cyclic succession from an individual multiplexer 101, and which supplies the corresponding digital representations to a digital processing unit 102 of the computer. The unit 102 of each computer receives not only digital representations of the input and feedback data from the converter 100 of that same computer, but also nominally-identical digital representations of the same data from the converters 100 of the other three computers. Each unit 102 acts in accordance with a stored program to compute a digital command dependent on the input and feedback data. The digital command signal will, in a well known fashion, be such as to achieve the required control surface movement having regard to the pilot's pitch demands as sensed by transducers 31 to 34 and the aircraft's motion, as sensed by sources 35 to 38. For the purposes of the computation the value of each item of data used is derived in accordance with a process of amalgamation of the set of four nominally-identical representations supplied in respect of that item. More particularly, each unit 102 is programmed to determine for each set of four digital representations whether any one of the set differs in value from the others by more than an amount prescribed in relation to the acceptable operational-tolerances applicable to that item of data, and if not to derive for use in the computation of the digital command a digital representation having a value (for example the mean or the median) intermediate the extremes of the range of the four signalled values. If any one of the signalled values differs by more than the prescribed amount from the others it is excluded from the derivation of the intermediate-value representation.

A signal in accordance with the digital command computed by the unit 102 of each control computer 27 to 30, is supplied via a respective digital-to-analogue converter 103 to a sample-and-hold circuit 104, and also directly to two digital-data transmitters 105 and 106. The output of the circuit 104 is compared in an amplifier 107 with a representation of the setting of the two spool valves 14 and 15. In the latter respect, there are four transducers 39 to 42 coupled to the link 16 for supplying to the amplifiers 107 of the four computers 27 to 30, respectively, analogue signals representative of the setting of the spool valves 14 and 15 (and thus of the rate of movement of the rams 11 and 12). The output signals of the amplifiers 107 of the four computers 27 to 30, which are each accordingly representative of the error in position of the spool valves 14 and 15, are applied to the actuators 17, 18, 20 and 21 respectively, in the sense to correct this error and thereby cause the rams 11 and 12, to drive the elevator surfaces 10 via the link 13 at a rate appropriate to satisfy the pilot's demand in pitch.

The output signals (all nominally identical) of the digital-data transmitters 105 of the control computers 27 to 30 are supplied to individual digital-data receivers 110 to 113 of a digital monitor-computer 43, whereas the output signals (all nominally identical, and also nominally identical to the output signals of the transmitters 105) of the transmitters 106 of the four control computers 27 to 30 are supplied to corresponding digital-data receivers 110 to 113 of a digital monitor-computer 44. Each of the digital monitor computers 43 and 44, indicated by a broken line, comprises the individual modules indicated by the solid-lined blocks within the respective broken lines, which, with their modes of operation, are hereinafter described. The digital signals received by the receivers 110 to 113 in each computer 43 and 44 are compared to detect whether any one of them is significantly inconsistent with the others and whether any of them has a rate of change significantly inconsistent with the others. To this end, each computer 43 and 44 includes a digital-processing unit 114 which acts according to a stored program to compare the four signals with one another and to derive a representative signal from them. This representative signal has a value in accordance with an amalgamate (mean or median value) of the four signals (but with any detected in the comparison process as being inconsistent with the others, or having an excessive rate of change, excluded). This representative signal is supplied via an individual digital-to-analogue converter 115 to a sample-and-hold circuit 116 for comparison in an amplifier 117 with a representation of the setting of the two spool valves 14 and 15. In the latter respect two transducers 45 and 46 corresponding to the transducers 39 to 42 are coupled to the link 16 for supplying to the amplifiers 117 of the two computers 43 and 44, respectively, analogue signals representative of the setting of the spool valves 14 and 15 (and therefore, as noted previously, of the rate of movement of the rams 11 and 12). The resultant error-signals are supplied to the actuators 19 and 22 respectively, in the same way as the error signals from the amplifiers 107 of the computers 27 to 30 are supplied to the actuators 17, 18, 20 and 21.

In the event that there is a component failure in any one of the four control computers 27 to 30 causing that computer to generate a control signal inconsistent with the control signals generated by the other three computers, then, as referred to above, that control signal is detected by the processing units 114 and excluded from the computations they perform. Consequently the control signals supplied to the actuators 19 and 22 will in general be in accord with the control signals supplied to three of the four actuators 17, 18, 20 and 21. Control of the setting of the spool-valve 14 or 15 from the faulty control computer will thus be overridden by the other control computer and the monitor computer which act in accord with one another to control that same valve, and their operation in this respect will be aided by the two control computers and the monitor computer controlling the other valve.

To summarize what has already been described, the probability of more than one of the computers 27 to 30 suffering the same component failure simultaneously is very low, and is within the normally-accepted limits for failure-survival. However, there remains the possibility that some particular value of input signal will generate a digital representation in the control computers 27 to 30 which, in conjunction with the programmed sequence of operations within the digital-processing units 102 will cause malfunction of each of them. Such malfunction might arise, for example, because the process of implementing the written computer program in terms of the logic embodied in the control computers 27 to 30, introduces an unpredictable and spurious interaction between the program and the data derived from the input signals.

The control computers 27 to 30 will each typically involve several thousand electrical circuits and an instruction program used in the computer will typically involve many thousand steps of calculation. If any one circuit operates incorrectly during any one calculation, the result of the entire computation prescribed by the instruction program will be erroneous. It has been found in practice that there is a possibility of erroneous computer-operation in this way even though the computer has apparently in all other respects been designed correctly and the signals appropriate to correct operation have been supplied to it. This may arise for example in circumstances in which the complex array of circuit interconnections within the computer give rise to an interaction between circuits which was not intended in the design, but which occurs in the event that one particular combination of binary data signals is supplied under the control of one particular program instruction when the computer circuits happen already to be in one particular combination of electrical states. These particular circumstances will be one of many millions of possibilities, making it impossible to test the design fully for such an interaction. Response of the system to this kind of circumstance is referred to as "pattern sensitivity" (meaning that the design is sensitive to one particular pattern, or combination of binary signals), but may be otherwise referred to in terms of a "context-dependent failure".

In the case of the system shown in FIGS. 1 and 2, all four control computers 27 to 30 are of the same design, and operate on the same program, so all four control computers 27 to 30 would be subject to any context-dependent failure simultaneously and in the same way. Such failure would not be detected by the monitor computers 43 and 44.

Safeguards against the possibility of a common-mode malfunction arising in this way are incorporated into the system of FIGS. 1 and 2. In this respect the input signals applied to the control computers 29 and 30 are applied in the opposite sense to the input signals applied to the control computers 27 and 28. To this end, the connections of the transducers 25, 26, 33 and 34, and of the sources 37 and 38, to the control computers 29 and 30 are reversed (indicated diagrammatically by crossover-line pairs R) as compared with the connections (indicated by uncrossed-line pairs D) of the transducers 23, 24, 31 and 32, and the sources 35 and 36, to the computers 27 and 28. This ensures that the binary numbers used to represent the same magnitude in the two pairs of computers 27 and 28, and 29 and 30 are different. The manner in which the difference arises may be demonstrated by considering the eight-digit 'twos-complement' binary number system set out in part in Table I.

Inspection of Table I illustrates that reversal of sign without change of magnitude is accompanied by a change in at least one of the binary digits of the representation. For example, even the binary representations +64 and −64 differ from one another in the value of their first digits. Comparable circumstances apply with any other binary notation used.

TABLE I

| 01111111 | = | + 127 |
|---|---|---|
| 01111110 | = | + 126 |
| 01111101 | = | + 125 |
| 01000001 | = | + 65 |
| 01000000 | = | + 64 |
| 00111111 | = | + 63 |
| 00000001 | = | + 1 |
| 00000000 | = | 0 |

TABLE I-continued

| 11111111 | = | − 1 |
|---|---|---|
| 11000001 | = | − 63 |
| 11000000 | = | − 64 |
| 10111111 | = | − 65 |
| 10000001 | = | − 127 |
| 10000000 | = | − 128 |

Thus although the control computers 27 to 30 all receive and operate on nominally-identical input and feedback data, the control computers 29 and 30 operate with combinations of binary digits which are different from those in the control computers 27 and 28. The difference of even one digit involved in the reversal of sign, is sufficient to ensure that any freak pattern that might give rise to context-dependent failures in the individual computers 27 to 30 does not occur in all four computers 27 to 30 simultaneously, and so does not lead to a common-mode failure of the whole system.

Compensation for the reversals of sign to the control computers 29 and 30, is made by reversals (R) introduced into the analogue signal connections from the transducers 41 and 42 to the amplifiers 107 of the computers 29 and 30, and from those amplifiers 107 to the actuators 20 and 21; these contrast with the direct, uncrossed connections (D) from the transducers 39 and 40, and to the actuators 17 and 18, in relation to the amplifiers 107 of the computers 27 and 28. The amalgamation programs performed in the units 102 of the control computers 27 to 30, and in the units 114 of the monitor computers 43 and 44, compensate automatically for the reversal of sign effective between one pair and the other of the compared digital representations; the alamgamate derived in each case is attributed the appropriate sign to maintain the difference of digital representation as between the different pairs of computers 27 to 30.

A context-dependent failure is most likely to manifest itself in each computer 27 to 30 in either of two ways: either in an abrupt change in the program cycle of the computer (for example, trapping the computer in a 'loop' of instructions); or in an obviously incorrect output command (such as a demand for the elevators to move suddenly to one extreme of their range of movement).

The digital-processing units 102 of the control computers 27 to 30 each complete one cycle of instructions, and thus regenerate their output commands, at intervals of between 10 and 20 milliseconds. Each digital processing unit 114 of the monitor computers 43 and 44 completes a related program of instructions, to compare and check the output commands of the control computers 27 to 30 and to regenerate its own output command, in the same interval of time whereas the digital processing units 102 produce output commands directly on the basis of the signals produced by sensors 31 to 34 and sources 35 to 38, the digital processing units 114 each produce a single output command on the basis of the output commands produced by all of the units 102. All of the output commands will be identical, in the absence of any malfunction. Thus any sudden change in program execution arising from a context-dependent failure in any of the control computers 27 to 30, results in the command signals generated by computer or computers involved departing from synchronizm with the command signals generated by monitor computers 43 and 44. The monitor computers 43 and 44 thus continuously monitor whether there is synchronizm of operation between themselves and the individual control computers 27 to 30; any detected loss of synchronizm affecting the two control computers 27 and 28, or 29 and 30, simultaneously, is treated as indicative of a common-mode failure as between that pair. The monitor computers 43 and 44 also monitor the rate of change of the control commands supplied from the control computers 27 to 30, and, if either pair of these calls for an excessive rate of change, then this again is indicative of a common-mode failure of the relevant pair. The output signals from the 'failed' control computers 27 and 28, or 29 and 30, are thereafter, in accordance with the monitor-computer program, disregarded in the generation of the control signals supplied to the actuators 19 and 22. Thus the control exerted by the 'failed' pair of computers via the actuators 17 and 18, or 20 and 21, is over-ridden by the other four actuators. It will be appreciated that the monitor computers 43 and 44 themselves could be subject to context dependent faults, and as the signals applied to, and the programs executed by, the two monitor computers are identical, context dependent faults could arise in them simultaneously. This does not affect the integrity of the whole system, since the control computers 27 to 30 are not simultaneously subject to such faults, and the control exerted by the "failed" pair of monitor computers via the actuators 19 and 22 is overridden by the control exerted by the control computers via the actuators 17, 18, 20 and 21.

It is possible for a context-dependent failure to result in an incorrect output command neither excessively different from a correct output command nor having an excessive rate of change, and therefore not detected by the monitor computers 43 and 44. However, in general the resultant differences between the command signals generated by the two pairs of control computers would not be large, and would not have serious consequences. Furthermore, since the failure would be due to a freak pattern of digits it is to be expected that this condition would be transient, and clear within a few seconds.

The computers 27 to 30 and 43 and 44 are used in the control of the ailerons and rudder, as well as of the elevators. More particularly there is time sharing of the major part of each of these computers between the three control functions, the only units not involved in the sharing being the sample-and-hold circuits 104 and amplifiers 107 of the computers 27 to 30 and the corresponding sample-and-hold circuits 116 and amplifiers 117 of the computers 43 and 44.

The invention is applicable beyond the context of the quadruplex, double-failure survival, system described above with reference to FIGS. 1 and 2. In this respect, and by way of further example, a monitored-duplex, single-failure survival system, embodying the invention is illustrated in FIG. 3.

Figure 3:
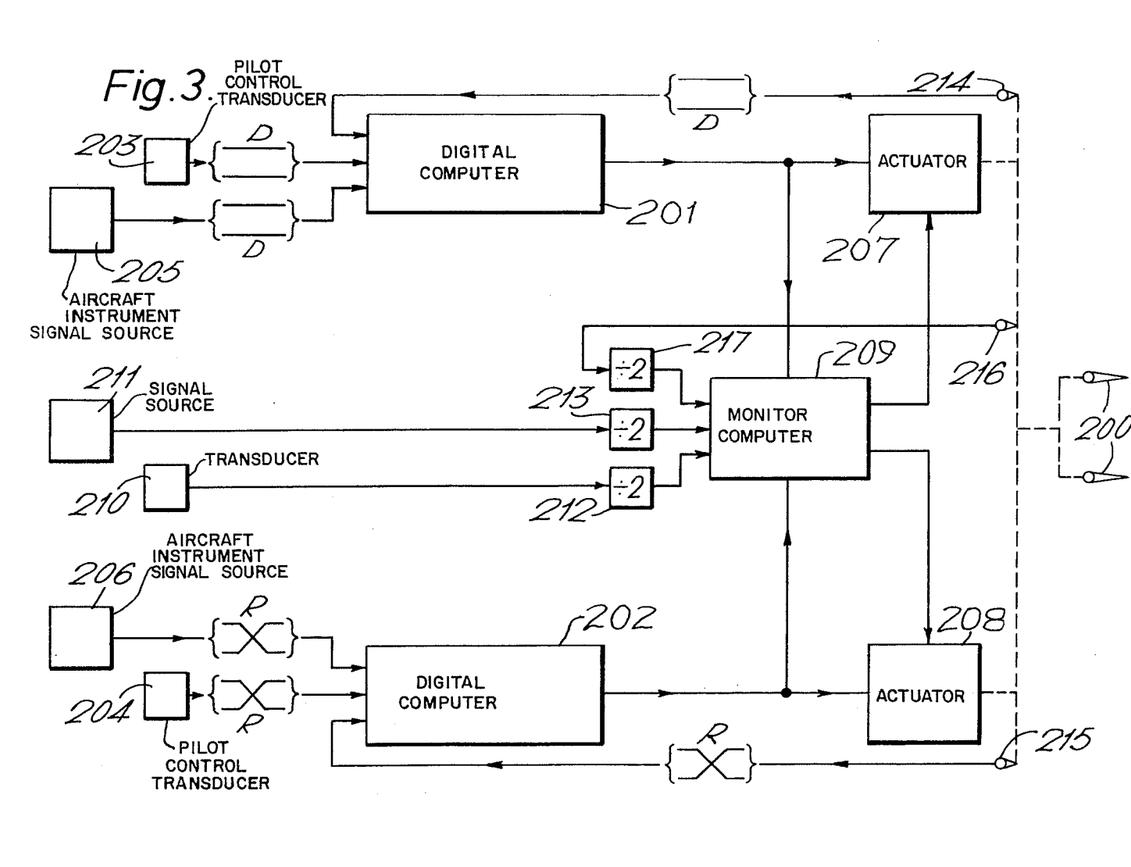
FIG. 3 is a block schematic diagram of the second flight-control system.

Referring to FIG. 3, the elevator surfaces 200 of the aircraft are in this case controlled from two digital computers 201 and 202. The computers 201 and 202 receive nominally-identical input signals from transducers 203 and 204, respectively, driven from the pilot's controls, and also from sources 205 and 206, respectively, from the aircraft instrumentation. The signals to the computer 202 are supplied via connections that are reversed (R) as compared with those (D) to the computer 201.

The output command signals of the computers 201 and 202 are supplied to individual actuators 207 and 208 that drive the elevator surfaces 200, and also to a common monitor computer 209. The computer 209 receives input signals from a transducer 210 and a source 210 and a source 211 corresponding to the transducers 203 and 204 and sources 205 and 206. These signals, however, are supplied to the monitor computer 209 via individual divide-by-two circuits 212 and 213.

Feedback from the elevator surfaces 200 is provided, in opposite senses, to the computers 201 and 202 from transducers 214 and 215, whereas feedback to the computer 209 is supplied via a divide-by-two circuit 217.

The monitor computer 209 performs the same digital computations as those performed by the computers 201 and 202, and in parallel with them. However the input- and feedback-signal magnitudes involved are only half those used (in opposite senses) in the computers 201 and 202, so that there are different digital patterns operative at any one time in the three computers. The possibility of there being a context-dependent failure simultaneously in two or more of the computers 201, 202 and 209, with consequent common-mode failure, is accordingly averted.

The monitor computer 209 checks whether the output commands of the control computers 201 and 202 are in accord with its own output. In the event of significant disagreement, there is disconnection of the relevant control computer 201 or 202.

The computers 201, 202 and 209 perform the digital computations appropriate for amalgamation of both the input and feedback signals; the interconnections for exchange of digital data in this respect between the three computers are omitted from FIG. 3. The digital representations are processed to derive the amalgamates and then to compute the output commands.

We claim:

1. In a control system including two control lanes for processing nominally-identical data digitally to derive nominally-equivalent control outputs, and means for comparing said outputs with one another to respond to the existence of a failure, the improvement wherein different digital representations of the same nominally identical data are used in the processing of the same data in the two lanes so that context dependent features (as defined) are detected.

2. A control system according to claim 1 including signal-supply means to supply nominally-identical analogue signals to the two lanes, and wherein each said lane includes means responsive to each signal supplied to that lane to apply in the subject lane a digital representation dependent on both the magnitude and sense of that signal, and said signal-supply means includes means to apply said nominally-identical signals in opposite senses to the two lanes.

3. A control system according to claim 1 wherein each lane includes digital processing means identical to the digital processing means of the other lane, and wherein the system includes means to supply first data signals in one sense to a first of the two lanes for processing digitally by the said processing means thereof, means for deriving second data signals identical to said first data signals, and signal-supply means for supplying said second data signals to the second lane for processing digitally by the said processing means thereof, said signal-supply means supplying said second data signals to the second lane in a sense opposite to said one sense.

4. A control system according to claim 1 including means to supply first data signals to a first of the two lanes for processing digitally therein, means for deriving second data signals having a predetermined proportional relationship to said first data signals, and means for supplying said second data signals to the second lane for processing digitally therein.

5. A control system according to claim 4 wherein said means for deriving said second data signals comprises means for deriving data signals identical to said first data signals and means for attenuating these said identical signals by a constant factor to provide said second data signals.

6. A plural-lane control system comprising: a plurality of means for processing data digitally to provide individual control outputs; data-input means to manifest data to said processing means, said data-input means comprising first supply-means for supplying digital representations of said manifested data to a first of said processing means, and second supply-means for supplying digital representations of said manifested data to a second of said processing means, the said digital representations supplied to said second processing means by said second supply-means being different from the said digital representations supplied by said first supply-means to said first processing means in respect of the same data, so as to avoid simultaneous context-dependent failure in said first and second processing means; and actuator means responsive to the control outputs of said first and second processing means to exert control in accordance therewith.

7. A control system according to claim 6 wherein said data-input means includes means responsive to said control exerted by said actuator means to derive feedback data, and means to include said feedback data in said manifested data.

8. A control system according to claim 6 wherein there is at least a third said processing means in addition to said first and second processing means, and wherein the said data-input means includes third supply-means for supplying digital representations of said manifested data to said third processing means, the said digital representations supplied to said first, second and third processing means in respect of the same data being different from one another.

9. A control system according to claim 6 wherein there is at least a third and a fourth said processing means in addition to said first and second processing means, and wherein said data-input means includes third supply-means operable to supply to said third processing means digital representations that are the same as those supplied to said first processing means by said first supply-means, and fourth supply-means operable to supply to said fourth processing means digital representations that are the same as those supplied to said second means by said second supply means.

* * * * *

UNITED STATES PATENT AND TRADEMARK OFFICE
CERTIFICATE OF CORRECTION

PATENT NO. : 4,130,241
DATED : December 19, 1978
INVENTOR(S) : JAMES F. MEREDITH and BRIAN WILLIAMS It is certified that error appears in the above-identified patent and that said Letters Patent are hereby corrected as shown below:

[30]  Foreign Application Priority Data

March 10, 1976  [GB]  United Kingdom..............9643/76

July 21, 1976   [GB]  United Kingdom.............30482/76

Signed and Sealed this

Twenty-seventh Day of March 1979

[SEAL]

Attest:

RUTH C. MASON
Attesting Officer

DONALD W. BANNER
Commissioner of Patents and Trademarks